United States Patent Office 3,278,328
Patented Oct. 11, 1966

3,278,328
METHOD OF COATING SUBSTRATES WITH INORGANIC POLYPHOSPHATES
Eugene H. Okrent, Middletown, N.J., assignor to Esso Research and Engineering Company, a corporation of Delaware
No Drawing. Filed Sept. 16, 1963, Ser. No. 309,303
10 Claims. (Cl. 117—47)

The present invention relates to inorganic polymers and, particularly, to inorganic polyphosphates. In a specific aspect, this invention relates to films or binders formed of these inorganic polyphosphates, which films or binders are applied to various substrates, e.g. metal, soil, etc.

Much is known about the use of organic polymers, e.g. polypropylene, polyethylene, ethylene-propylene copolymers, etc., as film forming materials and as binders, etc. These organic polymers have found widespread use and are relatively inexpensive. While these polymers have tremendous versatility under ambient conditions, they are not generally suited for use at even moderately elevated temperatures. For example, a number of these polymers melt substantially below 400° F.

Although relatively little is known of inorganic film forming materials, those skilled in the art have necessarily turned to the few such recognized inorganic materials where high temperature performance (e.g. above 600° F.) was contemplated. The more common inorganic materials to be employed have been the silicates. For some time, films formed from sodium silicate have been used as rust preventatives, even for ambient conditions, and as binders for applying solid lubricants, e.g. graphite, etc., to metal surfaces. Such films are much more satisfactory than conventional organic polymers for high temperature use. More recently, it has been proposed to form such films from a mixture of sodium and lithium silicates, which films are less porous, less water soluble, and have better adhesive properties. However, with either system (sodium or sodium/lithium) metal pretreatment by sandblasting, etc., was necessary to obtain a good bond between the metal and the film. This was especially true of surfaces having a high degree of curvature. The major disadvantage of the silicate films of the present art is their upper temperature limit, particularly where the film is subjected to sliding friction. With either type of silicate film, this upper limit seems to be about 1000° F. For example, friction tests were conducted by rotating a ½ inch uncoated steel ball at 200 r.p.m. under a 10 kg. load, against metal disks coated with a silicate film containing MoS₂ (about 78 parts by weight lubricant to 22 parts by weight silicate). For both silicates, below 750° F. the coefficient of friction was less than 0.1 and from 750° to 900° F. it was less than 0.15. At about 1000° F. the coefficient of friction rapidly increased to something greater than 0.4, indicating unsatisfactory performance. At 1400° F. there was evidence of gross flow of the solid film. No significant advantages could be seen, in this respect, for either the sodium or the sodium/lithium silicate film.

It has now been discovered, and this discovery forms the basis for the present invention, that polyphosphate films or binders may be prepared which polyphosphates have a much higher useful temperature range than do the silicates. These polyphosphates are useful as binders for applying solid lubricants to metal substrates; as surface coatings to prevent rust and/or to reduce friction; as binders for soil, metal, etc.; and as a vehicle for pigments, etc. Other uses, e.g. ablation shields, will be obvious to those skilled in the art. Aside from the polyphosphates, per se, the present invention also contemplates a method for preparing these polyphosphates, a method for preparing coated objects comprising these polyphosphates, and to articles of manufacture which comprise these polyphosphates.

The polyphosphate structures of the present invention are believed to exist as linear chains having the following structure:

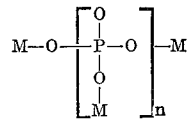

wherein M is a metal, e.g. Ca, Na, Li, K, Cu, etc. (Group I metals are preferred) and $n$ is an integer ranging from 2 to 40 or higher, more generally $n$ is from 2 to 25. For many of the ordinary applications of these polyphosphates, a value of $n$ of from 2 to 15 has been found particularly useful. Where other solid particles are incorporated into the polyphosphates and the polymer is then applied to a substrate, it has been found that a value of $n$ of from 6–10, e.g. 8 will give the better results. This is particularly true where low coefficients of friction are desired. Sodium is the preferred metal. Mixtures of metals may be used. These polyphosphates may be prepared by either of the following reactions:

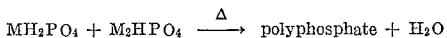

or

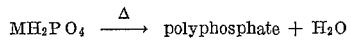

The latter technique is the least preferred since it produces a polymer of random length. With the first technique, it is possible to control chain length. In the past, coatings have been made by heating tri-metallic phosphates ($M_3PO_4$), alone, but such coatings require excessive temperatures for their formation, i.e. 1000–1450° F. or higher. At the present time, it is not known with any certainty just what structure such coatings have. Because of the high minimum temperature required for the formation of such coatings, however, they are of limited value since frequently the substrate and/or any pigment present will be seriously damaged.

In the prior art, other reactions of various phosphates have also been disclosed. See U.S. Patents 2,962,354 and 2,745,717. These reactions were generally characterized by (a) anhydrous conditions, (b) equal or substantially lower (e.g. 0.5:1) mole ratios of reactants when, for example, the mono and di-metal salts (e.g. $NaH_2PO_4$ and $Na_2HPO_4$) were reacted, (c) the absence of foreign solids (e.g. $MoS_2$) in the reaction mixture, and (d) low molecular weight products.

According to the present invention, however, it is preferred to conduct the polymerization reaction under hydrous conditions. In preparing surface coatings of polyphosphates, the reactants, in solution, have been sprayed or brushed on a surface and then heated to form a continuous film. The resulting surface coatings are more uniform and more tenacious than those applied by fusion techniques, etc. The amount of water used may vary over wide ranges. Preferably, the amount of water employed will be sufficient to completely dissolve all reactants. More water may be used if desired. Spraying is the preferred technique for applying the reactants to a substrate.

It is also preferred to incorporate foreign solids into the polyphosphate films. Such solids seem to provide some structure enhancing or cross-linking function. In any event, without being committed to any particular mechanism or explanation, the use of foreign solids (not to be confused with the addition of some polyphosphate product) materially reduces the temperature required for polymerizing the phosphate precursors. Preferably, but not necessarily, hydrous conditions are employed when foreign solids are used. This phenomenon is quite unique in that certain solid lubricants, pigments, etc., which could not be used with the silicate systems of the prior art due to gelation of pigment suspension, can now be used. In fact, it is their very use which allows these unusual polymers to be formed at low temperatures. There appears to be no practical limit to the number and variety of solids which have been or may be successfully employed. Selection of suitable solids seems to require more common sense than skill. Due regard must, as is usually true, be given to the contemplated use of the polyphosphate, the cost of the solid, decomposition temperatures, etc. Suitable solids have been shown to include graphite, talc, molybdenum disulfide, chromic oxide, cupric oxide, boron oxide, lead oxide, cadmium sulfide, etc. It is preferred to use simple metal compounds such as metal oxides, sulfides, nitrides, etc. and metals per se, e.g. graphite. Mixtures of foreign solids may also be used. Mixtures of $MoS_2$ and graphite in all proportions are preferred. These solids also increase the durability and flexibility of the polymer film. Particle size is not critical although best results are obtained when the average particle size is below 100 microns, e.g. 25 microns or less. The amount of foreign solids which may be included in the polyphosphates may vary over wide ranges. Generally a weight ratio of foreign solids to polyphosphate precursors (e.g. $NaH_2PO_4$) above about 0.1 will be employed. Weight ratios of as high as 10:1 or 20:1 or higher may be used. Best results seem to occur with a weight ratio of from about 0.5 to 6:1, e.g. 1:1 to 5:1.

The most preferred technique for forming the inventive polyphosphates is to employ the following reaction:

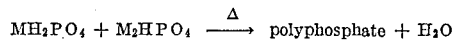

$$MH_2PO_4 + M_2HPO_4 \xrightarrow{\Delta} \text{polyphosphate} + H_2O$$

The number of monomeric polymer units in the ultimate polyphosphate structure can apparently be controlled by using a mole ratio of mono-metallic phosphate to di-metallic phosphate equal to about $n-2/2$, wherein $n$ equals the number of desired monomeric units. Mole ratios of greater than 2:1 are preferred. For solid film lubrication, mole ratios of about 3:1 are the most preferred.

When water solutions of the reactants are applied to metal substrates, it has been observed that better results (improved film structure) are obtained if the substrate is first heated to above 100° C., e.g. above 150° C., prior to applying the reactants. Preferably the substrate is heated to 175°–250° C., e.g. about 200° C.

After the inventive polyphosphates have been applied to a substrate, the coated substrate is heated to a polymerizing temperature for a time sufficient to ensure complete or substantially complete polymerization. For the preferred $Na_2HPO_4/NaH_2PO_4$ system of this invention, the polymerization reaction has been observed to take place at temperatures of from 570° to 2380° F. Generally, the lower temperatures, i.e. 570–800° F., favor bonding to metal surfaces. At higher temperatures polymerization takes place, but film adherence becomes poorer. Pressure may be sub atmospheric or super atmospheric and is not critical. Since the reaction proceeds well at atmospheric pressure, it is preferable to employ ambient pressure. The rate of heating and temperature of polymerization should be controlled to prevent film rupture and/or pigment oxidation. Such control is believed to be well within the skill of the art. Preferably, sprayed substrates are air dried for 0.1–10 hours before heating to polymerization temperatures. Usually 0.2–2 hours of air drying is sufficient. This air drying pretreatment seems to enhance film structure and adhesiveness. Subsequently, the coated substrate is heated to the polymerization temperature. Heating periods of 1–10, e.g. 2–4 hours are usually satisfactory although other heating periods may be used.

The present invention will be more clearly understood by reference to the following examples, which include a preferred embodiment. Unless otherwise indicated, all parts are by weight.

EXAMPLE 1

One hundred parts of powdered $NaH_2PO_4$ is heated to a polymerizing temperature of about 650° F. for 4 hours. On heating, the reaction mixture evolves water. After cooling, a long chain, linear, solid, polyphosphate is recovered, which polyphosphate is a random mixture of molecular weights.

EXAMPLE 2

The procedure of Example 1 is repeated. 200 parts of finely divided talc is added to the powdered phosphate prior to heating. A reduction in the effective temperature for polymerization is noted.

EXAMPLE 3

A number of polyphosphates of controlled molecular weight are prepared by first forming a mixture of 35 parts of $MoS_2$, 3.5 parts of graphite, 113 parts of water and 13 parts of polyphosphate precursor. The polyphosphate precursor is a mixture of $Na_2HPO_4$ and $NaH_2PO_4$ wherein the mole ratio of the latter to the former is given by the formula $n-2/2$ and $n$ is the desired number of monomeric polymer units desired in the polyphosphate. Samples are prepared by varying the $NaH_2PO_4/Na_2HPO_4$ ratio so as to give values of $n$ of from 2–15. Each of these mixtures is sprayed on a metal disc and a small metal ball having a high degree of curvature (¼ inch radius). The metal substrates are all preheated to 190–210° C. prior to spraying, sprayed, air dried for about 30 minutes and oven baked for 3 hours at 700–750° F. At higher polymerization temperatures (e.g. 1000° F.) film adherence is observed to be poor. The coated ball and discs are then cooled and inspected. It is noted that film adherence is best where $n$ equals 6–10 with $n$ equal to about 8 giving the optimum results. The films are tough and are effective in adhering to the small metal balls in spite of their small radius of curvature. The coated discs are then tested for friction at 1250° F. in the manner previously described (200 r.p.m., 10 kg. load, ½ inch steel ball). These samples are compared under identical conditions with discs coated with sodium and sodium/lithium silicates of the prior art, which silicates contained the same amount of $MoS_2$ and graphite and were prepared according to accepted techniques. Some of these results are shown below in Table I.

Table I

| Binder | Coefficient of Friction | Observed condition of coating at 1,250° F. |
|---|---|---|
| Sodium silicate | 0.238 | Melts. |
| 25% sodium-/75% lithium-silicate | 0.217 | Melts. |
| Polyphosphate ($n=15$) | 0.149 | Coats Poorly. |
| Polyphosphate ($n=10$) | 0.098 | Coats Well. |
| Polyphosphate ($n=8$) | 0.085 | Coats Well. |

From Table I it is seen that the polyphosphates of the present invention, when used as binders, give a marked friction advantage over the conventional silicate binders of the present art. Moreover, the inventive polyphosphate binder systems provide a much more stable, tenacious film than do the silicate binders. Experience shows the inventive polyphosphates (e.g. $n=8$) to be thermally stable at temperatures at least 400° F. (limit of test apparatus used) above the upper useful temperature limit of either of the silicate systems.

EXAMPLE 4

500 parts of a finely divided soil, 90 parts of polyphosphate precurser (mono and di-sodium phosphates in a mole ratio of 3:1) and 1000 parts of water are intimately mixed by stirring. The mixture is then compacted into a brick-shaped mass and air dried for 2 hours. The dried mass is then heated at 640–675° F. for about 6 hours. The resulting cohesive mass, on cooling is useful as a construction material.

EXAMPLE 5

Example 4 is repeated using iron filings in lieu of the soil. The polymerizing temperature is 740–775° F. The resulting cohesive mass is useful as an expendable wearing surface.

Having described the present invention with a certain degree of particularity, it will be realized that numerous modifications and adaptations may be made within the spirit and scope of the invention as hereinafter claimed.

What is claimed is:

1. A method for coating substrates with a hard film which comprises:
    (a) forming a hydrous mixture of $MH_2PO_4$ and $M_2HPO_4$, wherein M is a metal,
    (b) applying said mixture to a surface of said substrate,
    (c) heating said substrate and said mixture to polymerize said $MH_2PO_4$ and said $M_2HPO_4$, and
    (d) recovering said coated substrate.
2. A method as defined in claim 1 wherein M is sodium.
3. A method as defined in claim 2 wherein finely divided foreign solids are added to said hydrous mixture before applying it to said surface.
4. A method as defined in claim 3 wherein said foreign solids comprise a pigment.
5. A method as defined in claim 3 wherein said foreign solids consists essentially of a mixture of $MoS_2$ and graphite.
6. A method as defined in claim 3 wherein said foreign solids comprise soil.
7. A method for coating a substrate with a hard film which comprises:
    (a) forming a hydrous mixture of $NaH_2PO_4$ and $Na_2HPO_4$ in a mole ratio of at least 2:1, said hydrous mixture also containing from 0.5 to 6 parts by weight of finely divided foreign solids per part by weight of combined $NaH_2PO_4$ and $Na_2HPO_4$,
    (b) applying said mixture to a surface of said substrate,
    (c) heating said substrate and said mixture to a polymerizing temperature, and
    (d) recovering said coated substrate.
8. A method as defined in claim 7 wherein said foreign solids consist essentially of $MoS_2$ and graphite and wherein said polymerizing temperature is from 570 to 800° F.
9. A method as defined in claim 8 wherein said substrate is heated above 150° C. prior to applying said mixture.
10. A method as defined in claim 9 wherein said substrate is air dried for 0.1–10 hours after said mixture has been applied to said surface and before said polymerization occurs.

References Cited by the Examiner

UNITED STATES PATENTS

| | | | |
|---|---|---|---|
| 2,332,209 | 10/1943 | Enquist | 148—6.15 |
| 2,745,717 | 5/1956 | Edwards. | |
| 2,856,322 | 10/1958 | Parson et al. | 148—6.15 |
| 2,962,354 | 11/1960 | Edwards. | |
| 2,986,449 | 5/1961 | Rodis et al. | |

ALFRED L. LEAVITT, *Primary Examiner.*

J. R. BATTEN, JR., *Examiner.*